(12) United States Patent
Jones et al.

(10) Patent No.: US 8,003,189 B2
(45) Date of Patent: Aug. 23, 2011

(54) OPTICAL SCANNING WINDOW

(75) Inventors: Christopher D. Jones, Amherst, NH (US); Pierre A. Chaussade, Orleans (FR)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 464 days.

(21) Appl. No.: 11/672,757

(22) Filed: Feb. 8, 2007

(65) Prior Publication Data

US 2007/0188826 A1    Aug. 16, 2007

Related U.S. Application Data

(60) Provisional application No. 60/772,530, filed on Feb. 10, 2006.

(51) Int. Cl.
*B32B 3/14* (2006.01)
*G06K 7/00* (2006.01)

(52) U.S. Cl. .......... 428/78; 428/426; 428/430; 428/441; 428/80; 435/454

(58) Field of Classification Search ............ 428/426, 428/430, 441, 78, 80, 96; 235/454
See application file for complete search history.

(56) References Cited

U.S. PATENT DOCUMENTS

| | | | |
|---|---|---|---|
| 5,594,231 A * | 1/1997 | Pellicori et al. | 235/462.32 |
| 6,045,046 A | 4/2000 | Detwiler | |
| 6,543,694 B1 | 4/2003 | Detwiler | |
| 2004/0202879 A1* | 10/2004 | Xia et al. | 428/500 |
| 2005/0227117 A1 | 10/2005 | Locher et al. | |

FOREIGN PATENT DOCUMENTS

EP    0494829    7/1992

* cited by examiner

*Primary Examiner* — Gwendolyn Blackwell
(74) *Attorney, Agent, or Firm* — Finch & Maloney PLLC

(57) ABSTRACT

A scanner window and method of making a scanner window are provided. The window may include three layers. The layers may be a ceramic layer such as sapphire, a glass backing, and an adhesive layer comprising a polymer sheet. The window may be formed by stacking the components together and applying heat and pressure to result in adhesion of the ceramic layer to the glass layer. Additional features of the window may include improved strength, clarity and shatter resistance.

11 Claims, 4 Drawing Sheets

Example of Scanner Window Production Process

OPTICAL SCANNING WINDOW

RELATED APPLICATION

This application claims benefit of U.S. Provisional Patent Application Ser. No. 60/772,530, titled "OPTICAL SCANNING WINDOW," filed Feb. 10, 2006 and which is hereby incorporated by reference herein.

BACKGROUND

1. Field of Invention

The invention relates to optical devices and, in particular, to windows for optical scanning devices and methods of manufacturing optical scanner windows.

2. Discussion of Related Art

Optical scanning devices, or optical readers, are widely used throughout commerce and include products such as retail checkout scanners and inventory control systems. Typically, a scanner is used to read encoded data such as a printed bar code. The data may include information regarding, for example, manufacturer, product and price. In the most common applications, the scanner illuminates the barcode with light and reads reflected light off of the barcode. After reading the code from a product or label, a database can be accessed to obtain product information and to record the scanning event for use in, for example, inventory, accounting, marketing, etc.

Most modern scanning devices use a laser beam, typically produced by laser diodes, to provide a focused, collimated light that can be quickly scanned across a barcode. The use of a laser can improve reading ability and reading accuracy at a distance and with non-planar barcodes. Using a device such as one or more mirrors, the laser light can be scanned in multiple directions at high frequency to capture barcodes regardless of the barcode orientation in relationship to the scanner. This means that the barcode need not be aligned in any particular direction to be accurately scanned. Scanners may be handheld or stationary (e.g., fixed mount scanners), and to facilitate reading, the scanner may be moved to the product or the product may be moved to the scanner.

Scanners typically include a window separating the optical components of the scanner from the scanning area. Although a product code need not come in contact with the window in order to read the code, the product package and scanner window often contact each other during the scanning process. Because scratches on the surface of the scanner window may lead to inaccurate or nonfunctional scans, the external surface of a scanner window is often coated or covered with a material that is more scratch resistant than glass.

SUMMARY OF INVENTION

In one aspect a scanner window is provided, the scanner window comprising a ceramic sheet having a first surface area, a glass sheet having a second surface area greater than the first surface area, and a layer comprising a polymer sheet joining the ceramic sheet to the glass sheet.

In another aspect, a method of making a scanner window is provided, the method comprising stacking a glass sheet, a polymer sheet and a ceramic sheet to form a sandwich having a thickness of less than about 0.75 inch, applying pressure to the sandwich, and flowing the polymer sheet to a state of visual transparency to form the scanner window.

In another aspect, a method of making a scanner window is provided, the method comprising sandwiching a polymer sheet between a glass sheet and a sapphire sheet, the glass sheet having a nominal thickness of less than 0.5 inch, heating the polymer sheet, and cooling the polymer sheet to form the scanner window.

In another aspect, a scanner window is provided, the scanner window consisting essentially of a first layer comprising glass, a second layer comprising ceramic, and a third layer sandwiched between the first and second layers, the third layer comprising a pliable material capable of adhering the first layer to the second layer.

In another aspect an optical scanner is provided, the optical scanner comprising a light source, an optical detector for detecting bar codes, and a scanner window comprising a ceramic sheet, a glass sheet, and a polymer sheet sandwiched between the ceramic sheet and the glass sheet.

DETAILED DESCRIPTION

Figure 1:
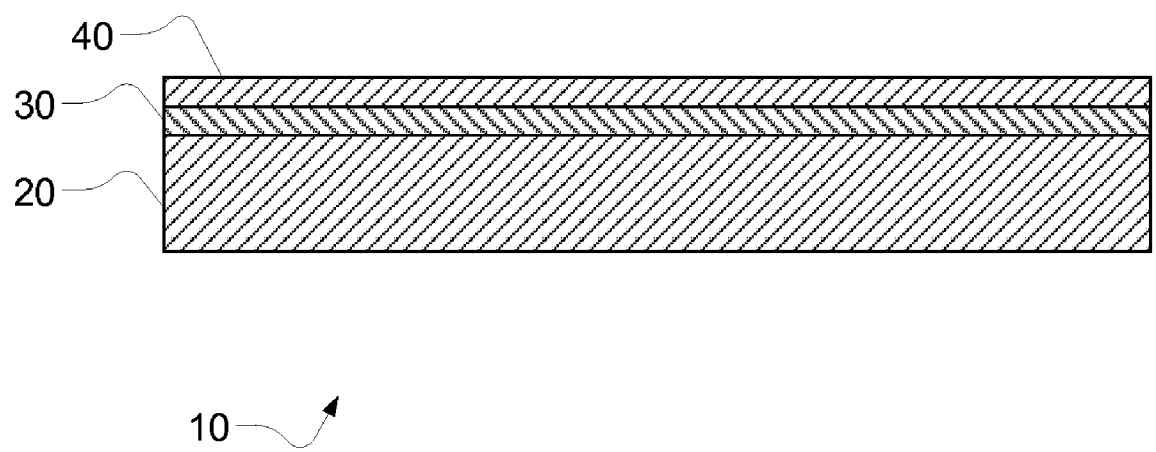
FIG. 1 is a schematic diagram showing a cutaway view of an embodiment of a ceramic composite.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As used herein, an "adhesive" is a material capable of joining two solids together so that they do not separate when subjected to an intended use. Adhesives may be either temporary or permanent.

A "composite" is an article made by bonding two or more separate materials together. The materials may be of the same or dissimilar composition.

A "polymer layer" is a substantially planar layer of polymer or pre-polymer that may be, for example, a liquid, a gel, or a solid such as a polymer sheet. Its physical and/or chemical structure may be altered.

A "polymer sheet" is a pliable sheet of synthetic polymer material that can be handled independently of a support backing. The polymer sheet may be chemically or physically altered by, for example, heat, pressure or chemical reaction.

A "scanner window" is a window that is substantially transparent to laser or other light used for reading optical codes such as barcodes.

"Single Crystal Sapphire" means $\alpha\text{-}Al_2O_3$, also known as corundum, that is primarily single crystal.

A "translucent" material is known to those skilled in the art and allows the transmission of light but does not provide for a clear image of objects.

A "transparent" material is known to those skilled in the art and allows for transmission of light and provides a clear, discernable image of objects. A "laser transparent" material is transparent to a particular laser wavelength.

The invention relates to a window used with optical scanning devices. The window may be comprised of a ceramic layer which may be, for example, a single crystal material such as sapphire. In addition to the single crystal layer, the window can include a backing layer such as glass, and an adhesive layer for retaining the layers together. The window may be transparent for the specific light source it is designed to be used with. For example, the window may be transparent to visible light such as a red laser, which is frequently used in retail checkout systems.

Scanner windows that include a layer of sapphire bonded to glass are known in the art. For example, European Patent Application Publication 0494829A2 describes a scanner window including a glass backing laminated to a sapphire layer using an epoxy resin. An epoxy resin adhesive keeps the sapphire attached to the glass and is transparent to the laser beams used in most checkout scanners. These epoxy adhesives are typically non-pliable and are applied as liquids or gels.

A scratch-resistant material laminated to a glass backing can provide for a longer lasting scanner window that is more durable when used in applications that potentially provide frequent contact with products and packages that can scratch glass. Although the crystal layer may provide improved scratch resistance, another problem that has become apparent to the inventors is the breaking and resultant shattering of the composite when impacted by hard objects. This problem is particularly troublesome with horizontally oriented scanner windows that protect the optics mounted below. Horizontally oriented scanner windows are convenient in that they allow products to be moved across the window, within range of the scanning laser, without the need for lifting or supporting the product. Unfortunately, when products are dropped during the scanning process, they can directly impact the scanner window, causing it to shatter. This can result in glass shards entering the optics of the scanner and causing extensive damage.

The present invention can provide for a stronger scanner window that is less susceptible to shattering. In the case of breakage, the window itself may need to be replaced but often the optics behind the window are undamaged due to the retention of glass shards by the laminated window.

The window may comprise a laminate, or sandwich, of an inorganic, non-metallic substrate and a sheet of glass sandwiched around an adhesive polymer layer, such as a liquid, gel, or polymer sheet. Inorganic, non-metallic substrates may include ceramics that can exhibit similar or superior transparency compared to glass and may be of greater hardness. Ceramic sheets may be single crystal or polycrystalline materials and may include, for example, aluminum oxynitride (ALON) and/or alumina. Alumina may be polycrystalline or single crystal and may include one or more of gamma, delta, theta, and alpha structures. A preferred form of alumina is single crystal alpha-alumina, also known as corundum, and also known as sapphire. A single crystal sapphire sheet may exhibit a purity of greater than 99%, greater than 99.5% or greater than 99.9% by weight.

The window's polymer sheet may help retain glass pieces after breakage of the window and can prevent glass shards from destroying the optics or from injuring a user. Polymer sheets may also have favorable adhesion characteristics and provide for improved production techniques. Some of the other advantages of polymer sheets will be discussed below.

In some embodiments the window, including a backing, a ceramic sheet, and an adhesive polymer sheet may have a thickness of less than or equal to 0.75 inch, less than or equal to 0.5 inch, or less than or equal to 0.25 inch. The scanner window may have a transmission capability of greater than 70%, greater than 80%, or greater than 90% at the particular wavelength used with the scanner.

Traditionally, sapphire/glass composite scanner windows have been made by gluing the glass to the sapphire sheet using a non-solid adhesive such as an acrylic resin gel. The resin is placed between a glass sheet and a sapphire sheet and cured to result in a finished composite window made of sapphire, acrylic resin and glass. Curing may be initiated by light, heat or chemical catalysis. This procedure may be labor intensive and can result in the entrapment of air bubbles between the sapphire and glass.

One method of manufacturing a scanner window according to the present invention is to place a solid but pliable polymer sheet between a sheet of glass and a sheet of ceramic such as single crystal sapphire. A combination of temperature and/or pressure can be applied so that the polymer sheet reaches its softening point, allowing the polymer to flow and fill any imperfections that may be present in either the glass or the sapphire. Upon the application of heat and/or pressure, polymer sheets may change from a hazy, translucent form to a visually transparent form providing, for example, improved light transmission through the scanner window. For example, at 160 degrees Celsius, a polyvinyl butyral (PVB) sheet may shift from a translucent state to a state of visual transparency. This shift may also result in adhesion between the adjacent sheets.

Some glass and/or ceramic surfaces may not be perfectly planar, i.e. flat, or may exhibit other surface imperfections. Using traditional manufacturing techniques, such as acrylic gel adhesives, these components may often result in unacceptable scanner windows due, in part, to portions of facing surfaces that are either too close or too far apart. In some cases, the gel may not prevent portions of the two facing surfaces from coming into contact with each other. Once two points are in contact, that portion of the two sheets cannot be further compressed and voids may result in other regions. A polymer sheet, however, may be thick enough that, even when under pressure, any planar imperfections in the adjoining faces of the ceramic and/or glass sheets do not result in the surfaces contacting each other or in portions of the facing surfaces being too far apart. The solid polymer sheet is typically resilient enough that, even when the sheets are under pressure, there are no points on the ceramic sheet that make contact with points on the glass sheet. Nonetheless, the polymer may soften enough so that it can fill in any voids between the sheets. As a result, optically acceptable scanner windows may be produced from imperfect sheets. This can result, for example, in reduced production times and improved scrap rates.

The resulting laminate is transparent to the red laser beam used in most checkout scanners. The scratch resistant sapphire layer can prevent scratches and gouges that may reduce scanning accuracy. The polymer layer may also provide a flexible adhesive layer that can retain glass and sapphire pieces should the window be broken. The window may be placed in a modular frame to aid in quick on-site replacement.

One of the components of the scanner window may be a laser transparent ceramic sheet. In a preferred embodiment, the ceramic sheet is single crystal $Al_2O_3$ (sapphire). Although sapphire is discussed in this detailed description, other ceramics and materials of adequate hardness and clarity may be substituted. For most scanner window types, the ceramic sheet is substantially planar although it may also include one or more radii. The sheet can be produced by several different methods including edge defined film fed growth techniques. Such methods of production are described in commonly-owned United States Patent Application by Locher et al titled "Single Crystals and Methods for Fabricating Same," U.S. patent application Ser. No. 10/820,468 filed on Apr. 8, 2004, which is incorporated by reference herein.

Other methods of production may also be used. For instance, the sheet may also be sliced from a boule. The sapphire sheet may be any shape although scanner windows are typically rectangular. The sheet may be, for example, a rectangle having a length of 6 inches and a width of 4 inches. The thickness of the sheet may be substantially uniform throughout the sheet and is typically thick enough to protect the surface below from scratches. In most scanner applications the thickness may vary from 0.01 inch or less to greater than or equal to 0.25 inch. In many applications, the sapphire sheet may have a thickness of less than 0.25, less than 0.1, less than 0.05, or less than 0.02 inch.

Another component of the scanner window may be a backing material, such as glass. The backing material is preferably substantially transparent to scanner lasers and may be strong enough to provide a solid backing to the window, allowing it to be handled and installed without breaking. The backing may be stiff and non-flexible. Backings may be of glass or other material and preferred types of glass include, for example, ultra clear, extra white or waterwhite glass. In some embodiments the glass may be float glass, and is typically a low iron glass. The backing material may be smaller than, larger than, or about the same size as the sapphire sheet, and is usually slightly larger in length and width when compared to the sapphire sheet. The backing material may be thicker than the sapphire sheet and in preferred embodiments is from about 0.1 inches to about 0.5 inches thick. Thickness will vary with the size of the window and the application. For example, a small handheld scanner may include a scanner window that includes a thin backing such as less than 0.25 inch. A larger stationary scanner that is horizontally mounted may be thicker, for example, greater than or equal to 0.25 inch. Other embodiments may include backing sheets of less than 0.75, less than 0.5, less than 0.5 or less than 0.25 or less than 0.1 inches in thickness.

The scanner window may include a third component that can serve several different functions. These functions include, for example, adhering the backing to the sapphire sheet, providing shattering resistance, providing transparency for passage of laser light, and facilitating manufacturing of the window. This component may be a polymeric layer such as a polymer sheet.

The sheet may be solid and flexible although its properties and chemical structure may be changed during the manufacturing process. The sheet may be a material capable of securely adhering glass to ceramic, capable of being independently handled, capable of being cut to size and/or capable of melting or softening. Such materials include, but are not limited to polymer sheets such as performance films, polyesters, polyvinyls and epoxies in sheet form. Preferably, the sheet is a polymer sheet that does not have a softening temperature (after production) that is below a temperature that the scanner will be stored or operated at. The thickness of the sheet may vary depending on the material and may be greater than 0.005 inch, greater than 0.01 inch, greater than 0.02 inch, greater than 0.03 inch or greater than 0.05 inch.

A preferred sheet is a polymer sheet comprised of a poly-vinyl material such as poly-vinyl butyral (PVB) or ethyl vinyl acetate (EVA), or co-polymers or terpolymers thereof. These materials may be available in a variety of thicknesses and sheets that can be cut to match the dimensions of the window or the dimensions of the ceramic sheet. Excess material can be trimmed away. A sandwich can be made using glass as an inner layer, sapphire as an outer layer and a polymer sheet as a central layer. After the layers are placed together the window may be formed as described below.

In one method of making the window, a backing material such as glass, a scratch-resistant material such as sapphire, and a polymer sheet are placed together to form a sandwich as described above. The components of the sandwich can be sized prior to construction to meet the requirements of the scanner window. The sandwich can be temporarily fastened together, for example, with tape, and then placed into a vacuum bag. The bag may be placed in a chamber and a vacuum may be drawn on the bag. The amount of vacuum can vary from application to application and may be, for example, greater than 100 mTorr, greater than 50 mTorr or greater than 10 mTorr. While under partial vacuum in the bag, the chamber may be pressurized and/or heated. At a chamber pressure of atmospheric pressure or above, the ceramic sheet and glass sheet may be pressed together as they remain under vacuum in the bag. Pressure may also be applied by mechanical means, for instance, rollers or a press. Pressure and heat may be applied until the polymer sheet reaches a softening point, allowing air bubbles to be expelled from the void (filled mostly by the polymer sheet) between the glass and sapphire sheets. Temperature and pressure may be varied significantly with different polymers and in some embodiments, the temperature may be raised to a point where cross-linking occurs in the polymer sheet. This temperature may vary greatly between polymer types and is referred to herein as the crosslink temperature. In other embodiments, there may be an absence of crosslinking or other chemical reactions and physical changes, such as softening and/or flow, may allow the window components to be joined. The crosslink or softening temperature may be, for example, greater than 70 degrees C., 80 degrees C., 90 degrees C., 100 degrees C., 150 degrees C., 160 degrees C., 200 degrees C. or 250 degrees C. An optimum temperature is dependent, in part, on pressure applied and on the specific polymer sheet that is used. For example, in some embodiments PVB may be heated to a temperature greater than about 120 degrees Celsius. In other embodiments, Ethyl vinyl acetate (EVA) may be heated to a temperature greater than about 70 degrees C.

Pressure applied may be, for example, greater than or equal to 0, 10, 20, 30, 40 or 50 psi. As air bubbles are expelled and the polymer softens, optical clarity through the window may improve and the sandwich may become transparent. Imperfections or unevenness on the inner facing surfaces of the sapphire or glass may be filled by the flowing polymer. After polymerization or hardening or cooling, the components of the window remain securely immobilized in relation to each other and any tape may be removed. The finished window may be placed in a frame or directly installed into an optical scanner.

Figure 2:
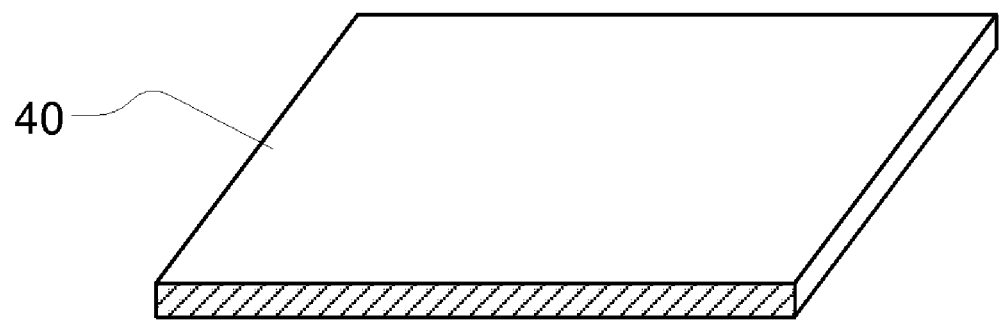
FIG. 2 provides a schematic view of the components of the composite of FIG. 1 prior to assembly.
Figure 2:
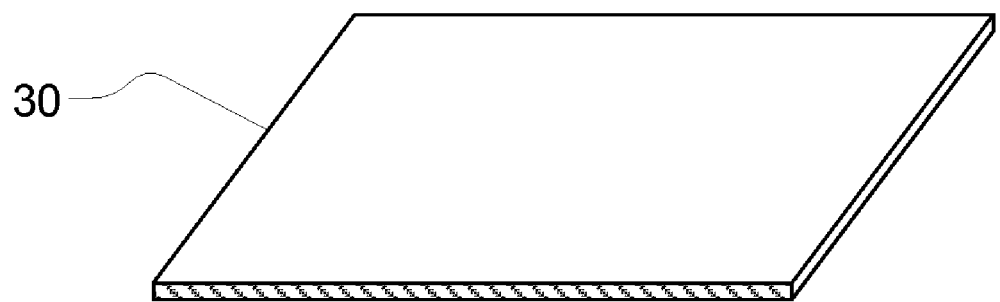
Figure 2:
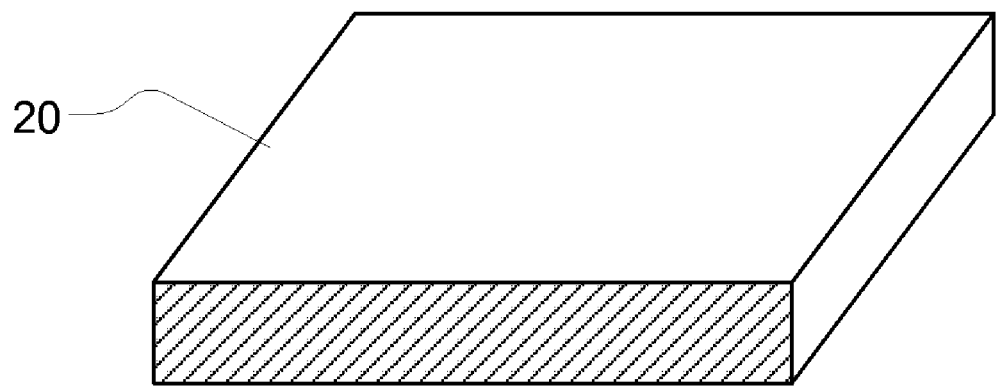

FIG. 1 illustrates one embodiment of the invention that includes a backing 20, a polymer sheet 30, and a sapphire (or other ceramic) sheet 40. Together, the components form window 10. FIG. 2 illustrates the same components before they are stacked together to form the composite window. Typically, each of the components is substantially planar and together form a substantially planar composite. In many cases the backing 20 will comprise glass and will be the thickest layer in the composite. The thickness of the polymer sheet is exaggerated in FIG. 1 and in most cases forms less than 1/10 of the thickness of the window and may be less than 0.1 inches thick. In a preferred embodiment the polymer sheet is PVB and the PVB sheet may be about 0.03 inches thick although this thickness may be reduced during production of the window. After production the resulting layer of adhesive polymer is generally greater than or equal to about 0.010 inch.

Figure 3A:
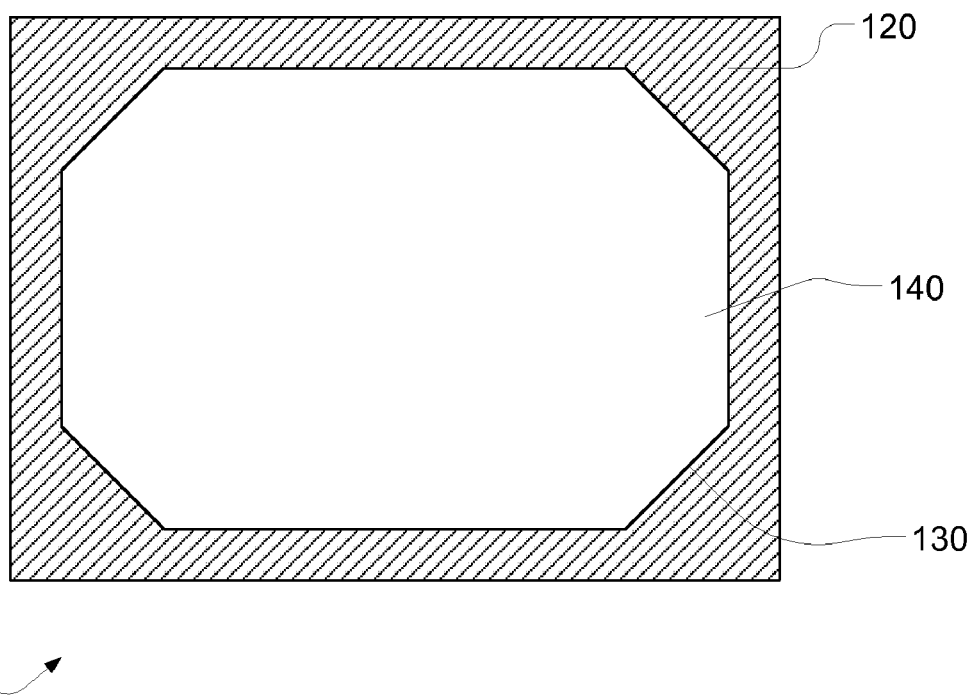
FIG. 3A provides a plan view of one window of the invention.
Figure 3B:
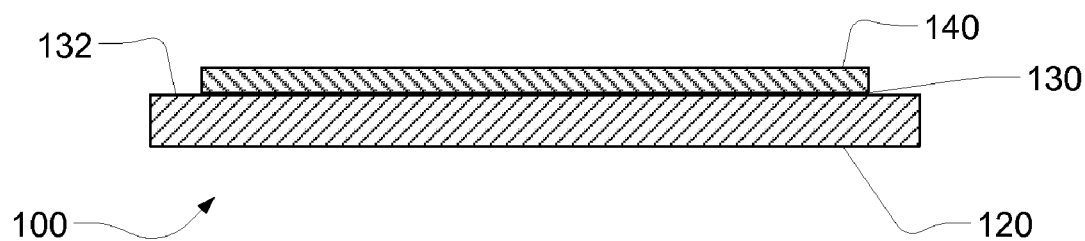
FIG. 3B provides a cross-sectional view of the window of FIG. 3A.

In another embodiment, such as that shown in FIGS. 3A and 3B, the ceramic sheet and glass sheet may be of different sizes and/or shapes. The top view in FIG. 3A shows that ceramic sheet 140 is smaller than glass sheet 120. As shown, ceramic sheet 140 is substantially an irregular octagon but may be in any other polygonal or non-polygonal shape. The portion of glass sheet 120 that extends beyond the periphery of ceramic sheet 140 forms shoulder 132 (FIG. 3B). Polymer sheet 130 may be sandwiched between the ceramic and glass sheets and may be substantially the same size and shape as ceramic sheet 140 or may be larger, extending beyond the edges of the ceramic sheet. Ceramic sheet 140 may be shaped so that shoulder 132 interfaces with a bezel on the scanner surface. The bezel (not shown) may be shaped to retain the window in the scanner by substantially covering shoulder 132 and obscuring the portion of glass sheet 120 that is not covered by ceramic sheet 140. This may serve to hold the scanner window in position. The bezel may be sized so that its edges are adjacent the edges of ceramic sheet 140 at one, two or more points around its entire periphery which may help to reduce or eliminate any lateral movement of the window in the housing. This may also provide for improved appearance and/or performance, with only the ceramic sheet surface visible to a user.

Prior to the production process the polymer sheet may be a pliable, solid sheet that can be shaped and manipulated. It can be cut, for example with scissors, to match the desired shape of the finished window. Unlike liquid resins, such as epoxy and acrylic resins, the polymer sheet can be easily sized and handled prior to sandwiching the layer between the backing and the sapphire. By using sheets of substantially consistent thickness, the amount of polymer, which also serves as an adhesive, can be accurately and consistently applied from window to window. Regardless of the size of the window, the use of a polymer sheet as an adhesive may provide consistent coverage over a given surface area. There may be no need to weigh out or accurately dispense adhesive resins onto either surface that is being joined. This feature can speed production and may result in more consistent adhesion and optical properties.

During the production process, the properties of the polymer sheet may be altered due to the application of heat, pressure or both. Initially the polymer sheet may exhibit a hazy or frosted appearance and may be translucent but not transparent. After application of heat and/or pressure, the polymer layer may soften and become transparent. The resulting transparency may be retained even after the window is cooled. The softening of the polymer may allow the polymer to flow, which can aid in filling in any imperfections in the ceramic sheet, the backing, or both.

Figure 4:
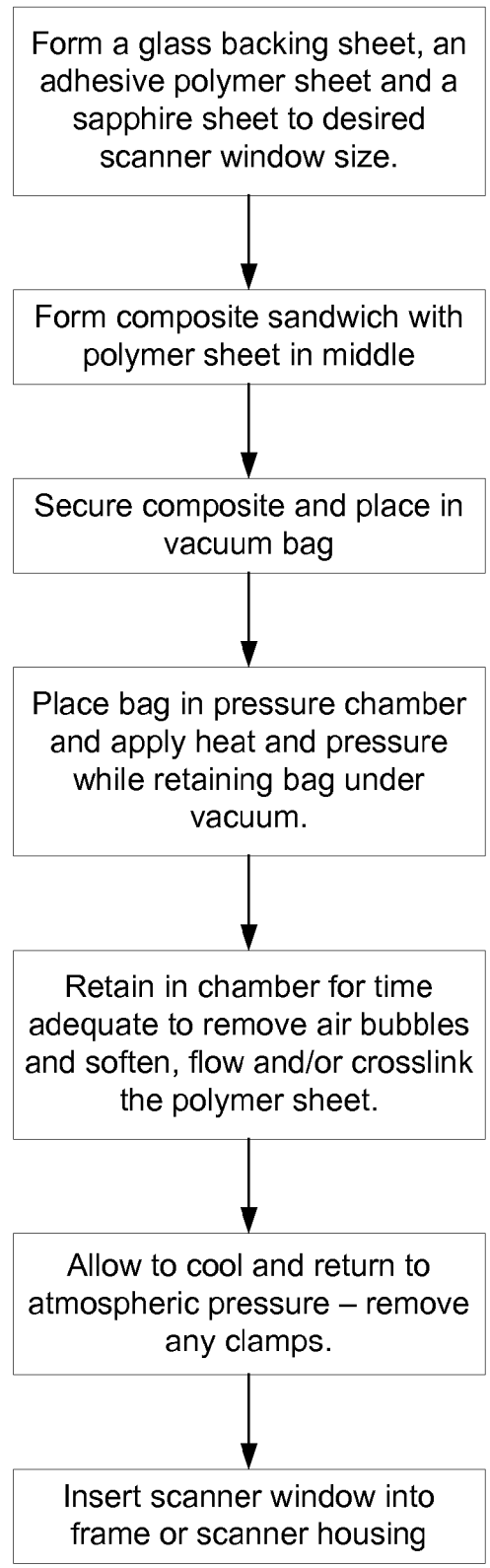
FIG. 4 provides a flow chart showing one embodiment of scanner window production.

In one embodiment, the production process (see FIG. 4) is started by choosing a backing 20, a ceramic sheet 40 and a polymer sheet 30 of the proper dimensions. In some embodiments the three components will have substantially the same length and width but will vary in thickness. See FIG. 2. The backing 20 may be placed on a temporary support and then covered by the polymer sheet 20. The ceramic sheet 40 may be placed on top of the polymer sheet 30 resulting in a composite sandwich 10. The components may then be temporarily secured in position by using tape, clamps, presses or other holding devices. The composite sandwich 10 may then be placed in a vacuum container such as a vacuum bag and a vacuum of up to about 10 mTorr, for example, may be applied. The entire vacuum bag may then be placed in a chamber, such as an autoclave, where pressure, heat or a combination thereof can be applied. The chamber may be heated to about 70 degrees C. or greater and pressurized to about 50 psi for an amount of time sufficient to allow the polymer sheet to soften and allow any trapped air bubbles to migrate from the region between the sapphire sheet and the backing. Additional vacuum may help in air bubble migration. In one embodiment, a time of about 2.5 hr was found to be sufficient to provide an optically clear scanner window without visually noticeable optical flaws. At the end of this time period, the window may be allowed to cool before it is removed from the vacuum bag. After cooling, the window may be removed from the vacuum bag and any tape holding the pieces together can also be removed. The polymer sheet can provide enough binding strength that the sapphire sheet and the backing cannot be separated without damage to one or both.

The resulting composite may be used as part of an optical scanner. In addition to the scanner window, a scanner may include a laser and associated optics, a microprocessor or other computer, a power supply, a housing and an interface. A scanner may include one or more windows and may be in communication with a central database. The scanner may also include scanning software contained on a computer-readable medium. Examples of appropriate scanners may be found, for example, in "Full Coverage Barcode Scanner," U.S. Pat. No. 6,045,046, and in "Extended Coverage Barcode Scanner," U.S. Pat. No. 6,543,694, both patent publications of which are incorporated by reference herein.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined. Other elements may optionally be present other than the elements specifically identified by the "and/or" clause, whether related or unrelated to those elements specifically identified unless clearly indicated to the contrary.

All references, patents and patent applications and publications that are cited or referred to in this application are incorporated in their entirety herein by reference.

What is claimed is:

1. A scanner window comprising:
a ceramic sheet having a first surface area;
a glass sheet having a second surface area greater than the first surface area; and
a layer comprising a polymer sheet joining the ceramic sheet to the glass sheet.

2. The scanner window of claim 1 wherein the second surface area is greater than 105% of the first surface area.

3. The scanner window of claim 1 wherein the ceramic sheet is substantially octagonal.

4. The scanner window of claim 1 wherein the polymer sheet layer has a nominal thickness of between 0.001 and 0.10 inch.

5. The scanner window of claim 1 wherein the ceramic and glass sheets are substantially planar.

6. The scanner window of claim 1 wherein the ceramic sheet comprises sapphire.

7. The scanner window of claim 1 wherein the polymer sheet comprises polyvinyl and/or polyurethane polymers.

8. The scanner window of claim 1 wherein the polymer sheet comprises polyvinyl butyral.

9. The scanner window of claim 1 wherein the polymer sheet comprises ethyl vinyl acetate.

10. The scanner window of claim 1 wherein the ceramic sheet comprises aluminum oxynitride.

11. The scanner window of claim 1 wherein the ceramic sheet comprises a spinel.

\* \* \* \* \*